US012578685B2

(12) United States Patent
Ichimura et al.

(10) Patent No.: US 12,578,685 B2
(45) Date of Patent: Mar. 17, 2026

(54) SENSOR DEVICE AND TIMEPIECE

(71) Applicant: CASIO COMPUTER CO., LTD.,
Tokyo (JP)

(72) Inventors: Tatsumi Ichimura, Ome (JP); **Yuma
Izunome**, Yamagata (JP)

(73) Assignee: CASIO COMPUTER CO., LTD.,
Tokyo (JP)

( * ) Notice: Subject to any disclaimer, the term of this
patent is extended or adjusted under 35
U.S.C. 154(b) by 313 days.

(21) Appl. No.: 18/339,452

(22) Filed: Jun. 22, 2023

(65) Prior Publication Data

US 2023/0418233 A1      Dec. 28, 2023

(30) Foreign Application Priority Data

Jun. 22, 2022      (JP) ................................ 2022-100274

(51) Int. Cl.
G04B 47/06          (2006.01)
G01L 19/14          (2006.01)
(52) U.S. Cl.
CPC ............ G04B 47/066 (2013.01); G01L 19/14
(2013.01)
(58) Field of Classification Search
CPC .... G04B 47/06; G04B 47/063; G04B 47/066;
G01L 19/14
See application file for complete search history.

(56) References Cited

U.S. PATENT DOCUMENTS 5,357,488 A  *  10/1994  Udo ..................... G04B 47/066
73/754
5,500,835 A  *  3/1996  Born ..................... G04C 3/146
368/11

7,742,365 B2      6/2010  Moteki et al.
2007/0121424 A1*  5/2007  Palin ........................ G01C 5/06
73/715
2009/0059736 A1   3/2009  Moteki et al.
2013/0135972 A1*  5/2013  Nakamura ............. G04G 21/02
368/11
2017/0269554 A1*  9/2017  Germiquet ............. G04B 37/08
2017/0276564 A1*  9/2017  Takeuchi ................. G01C 5/06
2018/0259909 A1*  9/2018  Kobayashi ............. G04B 37/08
2021/0263479 A1*  8/2021  Zhang .................. G04B 47/066

FOREIGN PATENT DOCUMENTS

JP          H05075695 U      10/1993
JP          2000241567 A      9/2000
JP          2010019823 A      1/2010
JP          2017053831 A      3/2017
JP          2017168336 A      9/2017

OTHER PUBLICATIONS

Notice of Reasons for Refusal dated Apr. 16, 2024 received in
Japanese Patent Application No. JP 2022-100274.

* cited by examiner

*Primary Examiner* — Sean Kayes
(74) *Attorney, Agent, or Firm* — Scully, Scott, Murphy &
Presser, P.C.

(57)          ABSTRACT

A sensor device including a case which has a sensor housing
portion provided in an outer circumferential portion thereof,
a sensor which is housed in the sensor housing portion, and
a connection hollow portion which is provided in an outer
circumferential portion of the case corresponding to an outer
side surface of the sensor, has a blocking portion integrally
provided with the case, and is connected to outside of the
case while covering the outer side surface of the sensor.

12 Claims, 4 Drawing Sheets

SENSOR DEVICE AND TIMEPIECE

CROSS-REFERENCE TO RELATED APPLICATION

This application is based upon and claims the benefit of priority from the prior Japanese Patent Application No. 2022-100274, filed Jun. 22, 2022, the entire contents of which are incorporated herein by reference.

BACKGROUND OF THE INVENTION

1. Field of the Invention

The present invention relates to a sensor device that is used in electronic devices such as wristwatches, and a timepiece equipped with the sensor device.

2. Description of the Related Art

For example, Japanese Utility Model Application Laid-Open (Kokai) Publication No. 05-075695 discloses a sensor device for wristwatches which has a structure where a sensor has been provided in a side surface portion of a wristwatch case so as to detect pressure such as atmospheric pressure and water pressure outside the wristwatch case.

SUMMARY OF THE INVENTION

A sensor device of the present invention comprises: a case which has a sensor housing portion provided in an outer circumferential portion thereof; a sensor which is housed in the sensor housing portion; and a connection hollow portion which is provided in an outer circumferential portion of the case corresponding to an outer side surface of the sensor, has a blocking portion integrally provided with the case, and is connected to outside of the case while covering the outer side surface of the sensor.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENT

An embodiment in which the present invention has been applied in a wristwatch will hereinafter be described with reference to FIG. 1 to FIG. 4.

Figure 1:
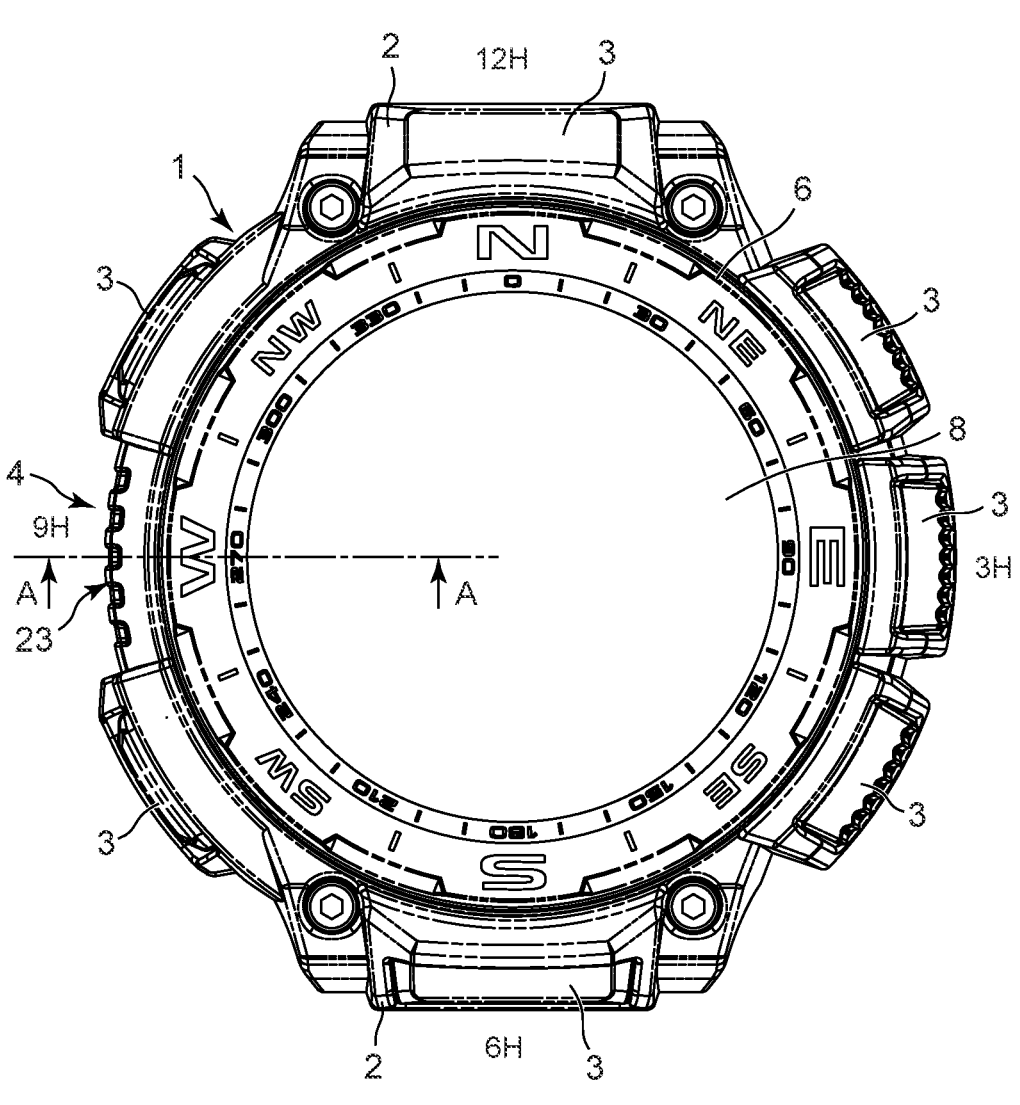
FIG. 1 is an enlarged front view showing an embodiment where the present invention has been applied in a wristwatch.
Figure 2:
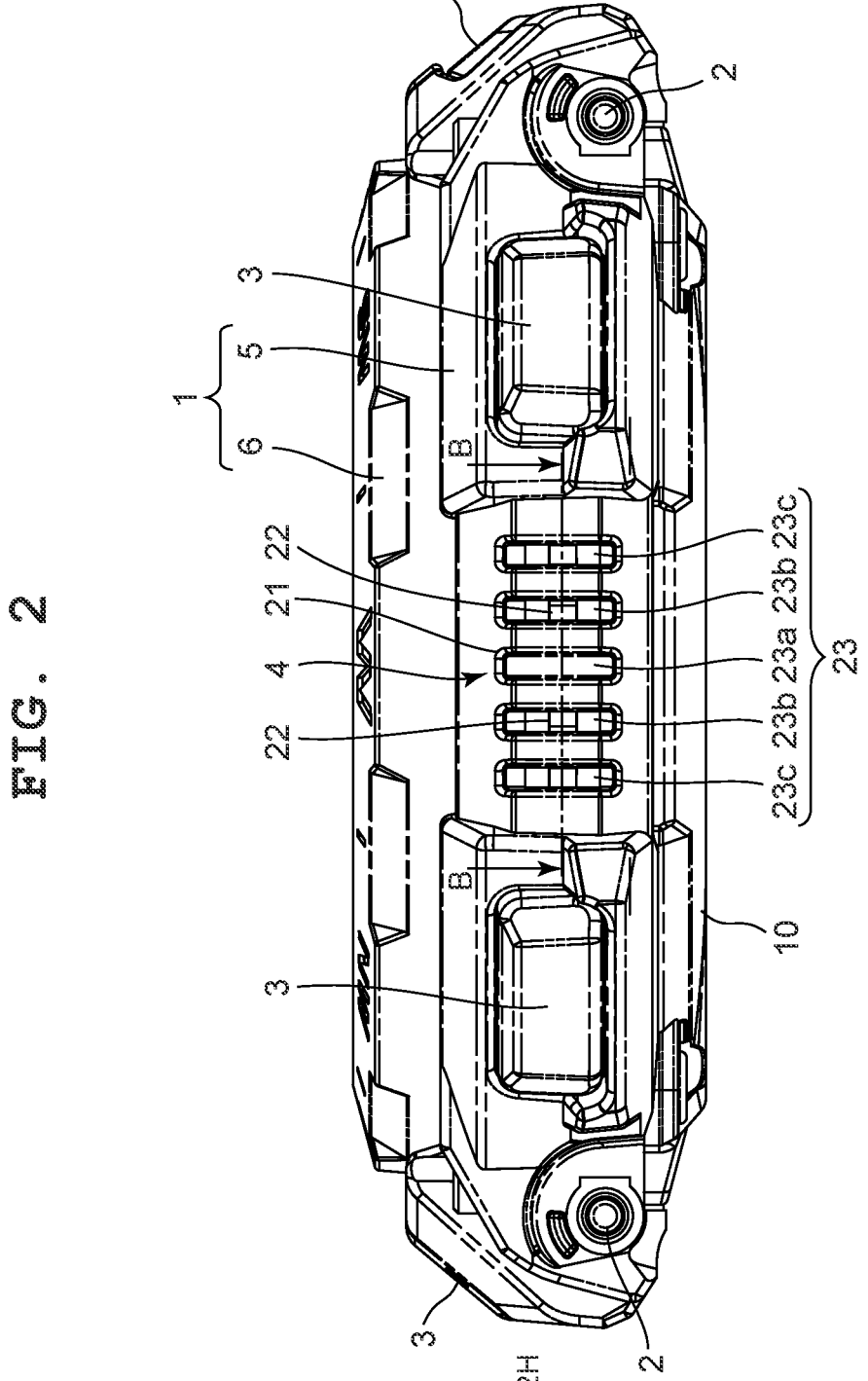
FIG. 2 is an enlarged side view showing the nine o'clock side of the wristwatch shown in FIG. 1.

This wristwatch includes a wristwatch case 1, as shown in FIG. 1 and FIG. 2. On the six o'clock side and twelve o'clock side of this wristwatch, band attachment sections 2 are provided to which watch bands (not shown) are attached.

In the structure of the above-described conventional technique, a sensor housing section is formed in the side surface portion of the wristwatch case while inwardly and outwardly penetrating through the wristwatch case, the sensor is housed in the sensor housing section from the inner side of the wristwatch case, and a sensor cover having a through hole is provided on the outer side of the sensor housing section having the housed sensor so as to protect the sensor.

However, the structure of this sensor device where the sensor is protected by the sensor cover has a problem in that the number of components such as the sensor cover increases, which complicates the structure.

The present embodiment is to improve this situation, and has a structure capable of achieving design enhancement by a simple structure.

On the twelve o'clock side, two o'clock side, three o'clock side, four o'clock side, six o'clock side, eight o'clock side, and ten o'clock side of the wristwatch case 1, push button switches 3 are provided, as shown in FIG. 1 and FIG. 2. The pushbutton switches 3 on the two o'clock side, the three o'clock side, the four o'clock side, the eight o'clock side, and the ten o'clock side are side switches on which switching operations are performed from lateral directions of the wristwatch case 1, and the push button switches 3 on the twelve o'clock side and the six o'clock side are upwardly oriented switches on which switching operations are performed from obliquely upward directions of the wristwatch case 1. Also, on the nine o'clock side of the wristwatch case 1, a sensor device 4 which detects pressure such as atmospheric pressure and water pressure outside the wristwatch case 1 is provided.

Figure 3:
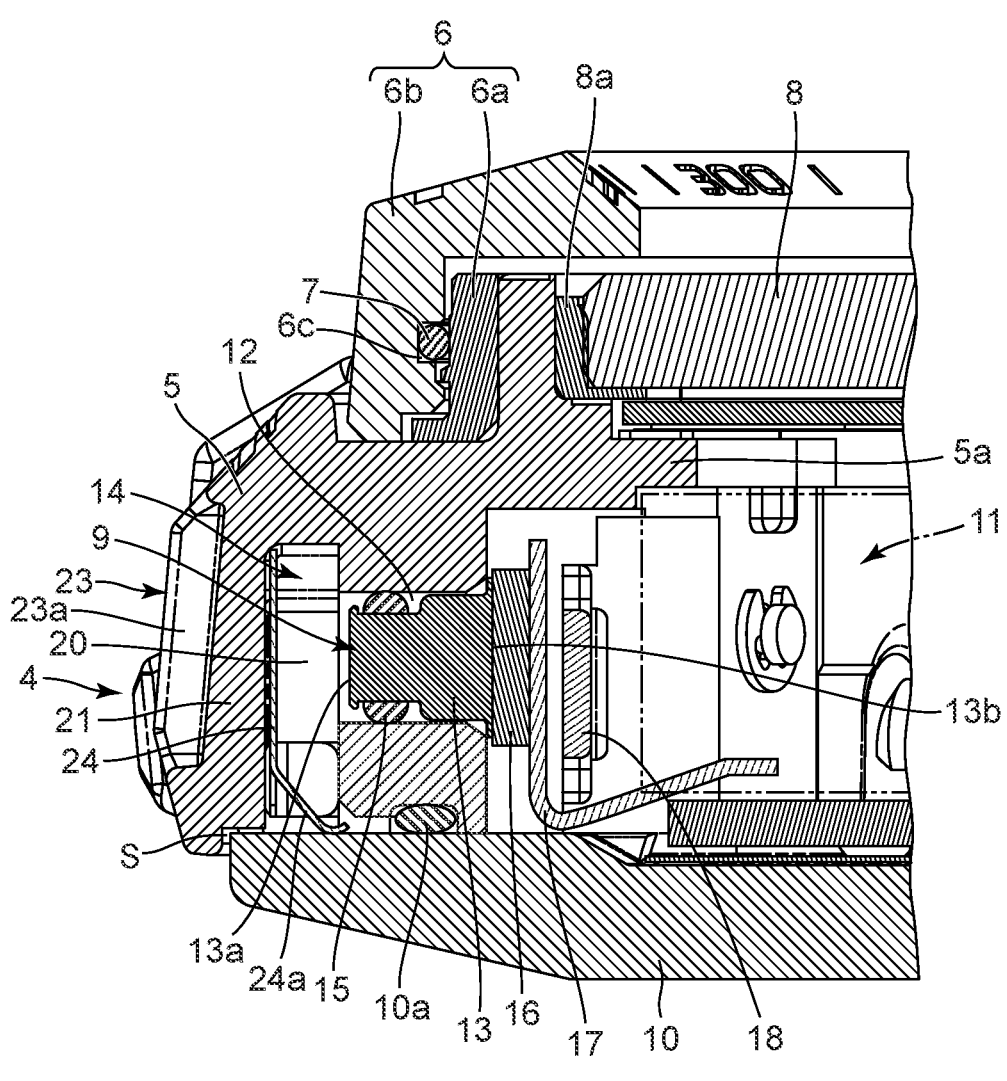
FIG. 3 is an enlarged sectional view showing a main portion of the wristwatch taken along the A-A arrow view in FIG. 1.

This wristwatch case 1 includes a main body case 5 and an exterior case 6, as shown in FIG. 3. The main body case 5 is made of a metal such as stainless steel or a highly rigid synthetic resin and has a cylindrical shape. On the upper side of the inner circumferential surface of the main body case 5, a flange section 5a is formed projecting in a ring shape.

The exterior case 6 includes a first exterior member 6a that is arranged on an outer circumferential portion of the upper part of the main body case 5, and a second exterior member 6b that is arranged covering an outer circumferential portion of the first exterior member 6a and the upper part of the main body case 5, as shown in FIG. 3. The first exterior member 6a, which is a buffering member, is made of synthetic resin, and the second exterior member 6b is made of a metal such as stainless steel or a highly rigid synthetic resin, as with the main body case 5.

As a result, the exterior case 6 is structured such that the first exterior member 6a is attached to the outer circumferential portion of the upper part of the main body case and, in this state, the second exterior member 6b is arranged covering the outer circumferential portion of the first exterior member 6a and the upper part of the main body case 5, as shown in FIG. 3. Also, the exterior case 6 is structured such that a first waterproof ring 7 is arranged in a packing housing recess section 6c formed in the inner circumferential surface of the second exterior member 6b, and the second exterior member 6b is arranged covering the outer circumferential portion of the first exterior member 6a and the upper part of the main body case 5 via the first waterproof ring 7.

To the upper opening of the wristwatch case 1, that is, to the upper opening of the main body case 5, a watch glass 8 is attached via a packing 8a, as shown in FIG. 3. Also, to the lower part of the wristwatch case 1, that is, to the lower part of the main body case 5, a back cover 10 that is a cover portion is attached via a second waterproof ring 10a.

The back cover 10 is formed using a metal such as stainless steel. However, this back cover 10 may be formed using synthetic resin, in which case a metal deposition layer is provided on its upper surface (inner surface). In the wristwatch case 1, that is, in the main body case 5, a timepiece module 11 indicated by a two-dot dashed line in FIG. 3 is provided.

Figure 4:
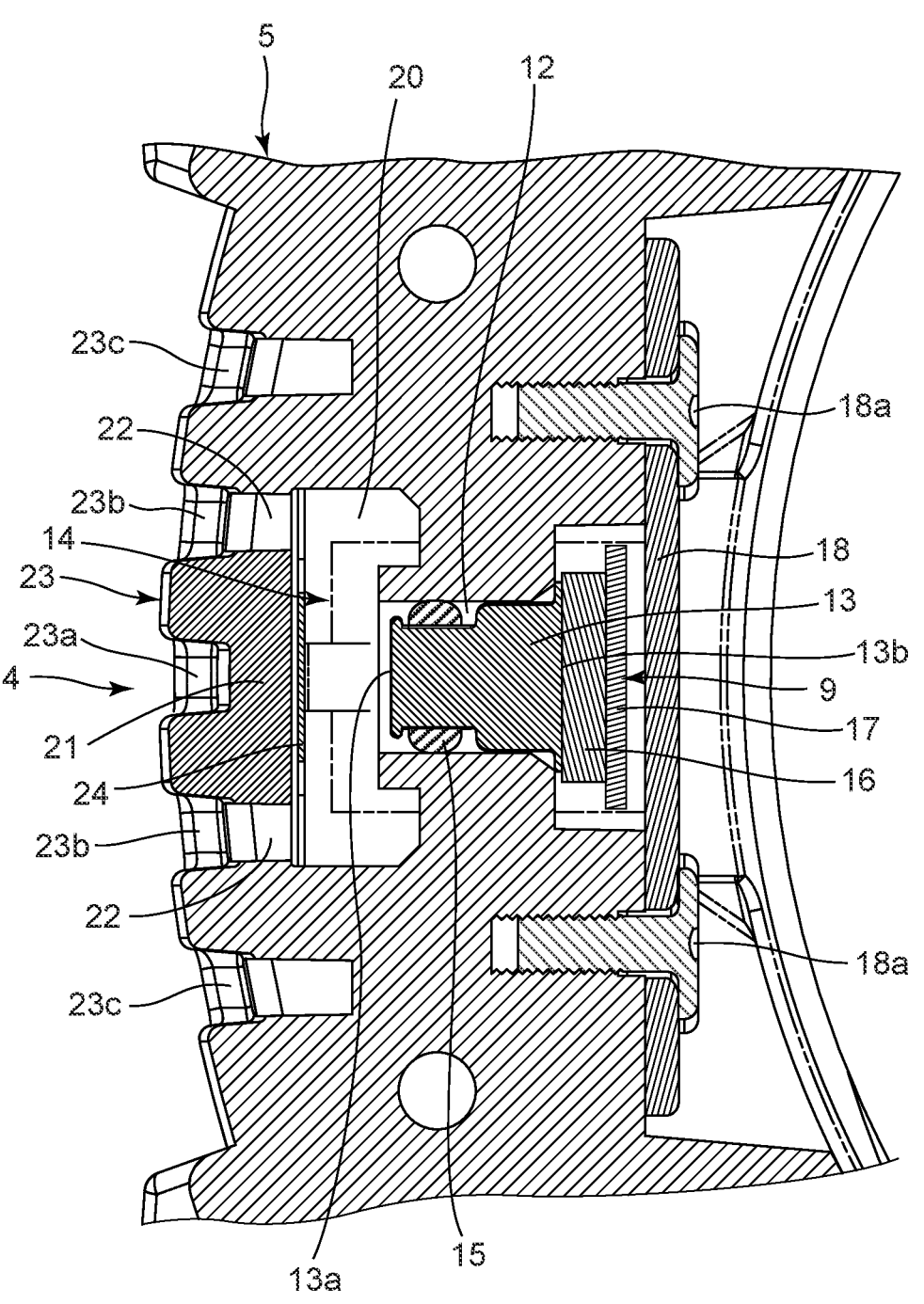
FIG. 4 is an enlarged sectional view showing the main portion of the wristwatch taken along the B-B arrow view in FIG. 2.

The sensor device 4 provided on the nine o'clock side of the wristwatch case 1 includes a sensor housing section 12 which is formed in an outer circumferential portion of the main body case 5 of the wristwatch case 1, a pressure sensor 13 which is housed in the sensor housing section 12, and a connection hollow section 14 which is formed in an outer circumferential portion of the main body case 5 corresponding to an outer side surface 13a of the pressure sensor 13 and connected to the outside of the main body case 5 while covering the outer side surface 13a of the pressure sensor 13, as shown in FIG. 3 and FIG. 4.

The sensor housing section 12 is a round hole formed between the inner circumferential surface of the main body case 5 and the connection hollow section 14, as shown in FIG. 3 and FIG. 4. The pressure sensor 13, which detects pressure such as atmospheric pressure and water pressure outside the main body case 5, has a substantially cylindrical shape, and is arranged in the sensor housing section 12 via a waterproof member 15. In this embodiment, the waterproof member 15, which is made of an elastic material such as rubber, has a ring shape and is attached to the outer circumferential surface of the pressure sensor 13.

More specifically, the waterproof member 15 is formed such that its inner diameter is shorter than the outer diameter of the pressure sensor 13 and its outer diameter is slightly greater than the inner diameter of the sensor housing section 12, as shown in FIG. 3. As a result, the waterproof member 15 is structured to come in pressure contact with the outer circumferential surface of the pressure sensor 13 and the inner circumferential surface of the sensor housing section 12 and achieves waterproofing therebetween when the pressure sensor 13 is housed in the sensor housing section 12.

To an inner side surface 13b of the pressure sensor 13, a sensor board 16 is attached while being electrically connected thereto, as shown in FIG. 3 and FIG. 4. This sensor board 16 is arranged in the main body case 5 and electrically connected to the circuit board (not shown) of the timepiece module 11 in the main body case 5 by a flexible wiring board 17. As a result, the pressure sensor 13 is electrically connected to the circuit board of the timepiece module 11 by the sensor board 16 and the flexible wiring board 17.

The pressure sensor 13, the sensor board 16, and the flexible wiring board 17 shown in FIG. 3 and FIG. 4 constitute a sensor unit 9, which is held down on the main body case 5 by a sensor hold-down plate 18 attached to the inner surface of the main body case 5 by a plurality of screws 18a.

The connection hollow section 14 includes a space section formed in an outer circumferential portion of the main body case 5 corresponding to the outer side surface 13a of the pressure sensor 13, a blocking section 21 which covers the outer side surface 13a of the pressure sensor 13, and connection holes 22 which connect the space section 20 to the outside of the main body case 5, as shown in FIG. 3 and FIG. 4.

The space section 20 is formed between the outer side surface 13a of the pressure sensor 13 housed in the sensor housing section 12 and the inner surface of an outer circumferential portion of the main body case 5 located outwardly away from the outer side surface 13a while corresponding to the outer side surface 13a, as shown in FIG. 3 and FIG. 4. This space section 20 is structured to be positioned closer to the outer circumferential side of the main body case 5 than the second waterproof ring 10a provided between the lower part of the main body case 5 and the back cover 10, to be open toward the lower side of the main body case 5, and to be mostly covered by the back cover 10.

The blocking section 21 is provided on an outer circumferential portion of the main body case 5 corresponding to the outer side surface 13a of the pressure sensor 13 via the space section 20 and positioned on the nine o'clock side of the outer circumference of the main body case 5, as shown in FIG. 1 to FIG. 4. More specifically, the blocking section 21 is integrally formed with the main body case 5 in a manner to be provided on an outer circumferential portion of the main body case 5 located outwardly away from the outer side surface 13a of the pressure sensor 13 via the space section 20, and positioned on the outer circumference of the main body case 5.

As a result, the blocking section 21 is structured to cover the outer side surface 13a of the pressure sensor 13 so as to protect the pressure sensor 13. That is, the blocking section 21 is structured such that erroneous contacts such as the user touching the pressure sensor 13 or an object colliding with the pressure sensor 13 are prevented, whereby the pressure sensor 13 is protected.

On the outer surface of an outer circumferential portion of the main body case 5 on the nine o'clock side including the blocking section 21 covering the outer side surface 13a of the pressure sensor 13, a decorative section 23 is formed, as shown in FIG. 3 and FIG. 4. This decorative section 23 is constituted by a plurality of slit grooves 23a to 23c elongated in vertical directions. Among these slit grooves 23a to 23c, one slit groove 23a in the middle is formed in the outer surface of the blocking section 21 such that it does not penetrate therethrough so as not to be connected to the space section 20 of the connection hollow section 14.

Also, in two slit grooves 23b located to the sides of the slit groove 23a in the middle, that is, in two slit grooves 23b located to the sides of the blocking section 21 having the middle slit groove 23a in directions along the outer periphery, connection holes 22 connected to the space section 20 of the connection hollow section 14 are formed, as shown in FIG. 4. Two slit grooves 23c located to the sides of these two slit grooves 23b provided with the connection holes 22 do not penetrate to the space section 20 of the connection hollow section 14 so as not to be connected thereto.

As a result, the decorative section 23 is structured such that, since the connection holes 22 formed in the two slit grooves 23b located to the sides of the middle slit groove 23a are inconspicuous, the outer appearance and design of the wristwatch case 1 can be enhanced with high decorativeness, as shown in FIG. 2 and FIG. 4. Also, the connection hollow section 14 is structured such that, because of the structure where external gas and liquid outside the main body case 5 enter into the space section 20 through the connection holes 22, pressure inside the space section 20 is equal to pressure outside the main body case 5.

This connection hollow section 14 includes an interspace S which is formed between the upper surface of an outer circumferential portion of the back cover 10 attached to the lower part of the main body case 5 and the undersurface of an outer circumferential portion of the main body case 5 corresponding to this upper surface of the outer circumferential portion of the back cover 10, and connected to the space section 20, as shown in FIG. 3. More specifically, this interspace S is formed extending from an upper surface (inner surface) portion of the back cover 10 corresponding to the connection hollow section 14 to an outer circumferential portion of the back cover 10, and located closer to the outer circumferences of the main body case 5 and the back cover 10 than the second waterproof ring 10a, whereby objects such as water and mud that have entered into the space section 20 of the connection hollow section 14 are discharged.

In the space section 20 of the connection hollow section 14, a terminal plate 24 which is an antistatic terminal member is provided, as shown in FIG. 3 and FIG. 4. This terminal plate 24 is a metal plate for shielding, and arranged on an inner surface portion of the space section 20 corresponding to and located at a distance from the outer side surface 13a of the pressure sensor 13 or, in other words, arranged on the inner surface of the blocking section 21 without blocking the connection holes 22.

Also, this terminal plate 24 is arranged such that its lower end portion 24a comes in contact with the upper surface (inner surface) of the back cover 10, as shown in FIG. 3 and FIG. 4. As a result, this terminal plate 24 is structured to shield the pressure sensor 13 from static electricity so that the pressure sensor 13 is not affected by static electricity from outside the main body case 5.

In the where the back cover 10 is made of a metal such as stainless steel, the lower end portion 24a of the terminal plate 24 may come in contact with any portion of the back cover 10, as shown in FIG. 3. However, in the case where the back cover is made of synthetic resin and has a metal deposition layer provided on its upper surface (inner surface), the lower end portion 24a of the terminal plate 24 is brought into contact with the metal deposition layer of the back cover 10.

Next, a procedure for assembling this wristwatch is described.

In this procedure, first, the watch glass 8 is fitted into and attached to the upper opening of the main body case 5 of the wristwatch case 1 together with the packing 8a. In this state, the wristwatch case 1 is assembled. In this assembly, first, the first exterior member 6a of the exterior case 6 is attached to the outer circumferential portion of the upper part of the main body case 5.

In this state, the first waterproof ring 7 is arranged in the packing housing recess section 6c formed in the inner circumferential surface of the second exterior member 6b of the exterior case 6, and the second exterior member 6b is arranged covering the outer circumferential portion of the first exterior member 6a and the upper part of the main body case 5 together with the first waterproof ring 7. As a result, the assembly of the wristwatch case 1 is completed.

Then, the sensor unit 9 of the sensor device 4 is attached to the wristwatch case 1. Before this attachment, the sensor unit 9 is assembled. More specifically, the sensor board 16 is attached to the inner side surface 13b of the pressure sensor 13 so that the pressure sensor 13 and the sensor board 16 are electrically connected to each other. In addition, the flexible wiring substrate 17 is attached to the sensor board 16 so that the sensor board 16 and the flexible wiring substrate 17 are electrically connected to each other.

In this state, the sensor unit 9 is attached to the main body case 5 and the terminal plate 24 is attached to the main body case 5. Here, before the sensor unit 9 is attached to the main body case 5, the ring-shaped waterproof member 15 is attached to the outer circumferential surface of the pressure sensor 13 and, in this state, the pressure sensor 13 is inserted into the sensor housing section 12 of the main body case 5 from the inner side of the main body case 5 and housed therein together with the waterproof member 15.

Here, the outer side surface 13a of the pressure sensor 13 is positioned corresponding to the blocking section 21 via the space section 20 of the connection hollow section 14 formed in the outer circumferential portion of the main body case 5, and thereby covered by the blocking section 21. As a result, the pressure sensor 13 is favorably protected by the blocking section 21 so that erroneous contacts such as the user touching the pressure sensor 13 or an object colliding with the pressure sensor 13 are prevented.

Also, here, the sensor board 16 for the sensor unit 9 and the flexible wiring substrate 17 are arranged in the main body case 5. In this state, the sensor hold-down plate 18 is attached to the inner surface of the main body case 5 by the plurality of screws 18a, and holds down and fixes the sensor unit 9 on the main body case 5. As a result, the sensor unit 9 is attached to the main body case 5.

Also, when the terminal plate 24 is to be attached to the main body case 5, this terminal plate 24 is arranged on the inner surface portion of the space section 20 of the connection hollow section 14 corresponding to and located at a distance from the outer side surface 13a of the pressure sensor 13. That is, the terminal plate 24 is arranged on the inner surface of the blocking section 21. Here, the terminal plate 24 is arranged in a manner not to cover the connection holes 22 connected to the space section 20. In addition, the lower end portion 24a of the terminal plate 24 is bent at an angle to be tilted toward the inner side of the main body case 5 while protruding below the main body case 5.

In this state, the timepiece module 11 is mounted in the main body case 5. Here, the push button switches 3 are attached to the twelve o'clock side, two o'clock side, three o'clock side, four o'clock side, six o'clock side, eight o'clock side, and ten o'clock side of the main body case 5 in advance. Subsequently, the flexible wiring substrate 17 of the sensor unit 9 is connected to the circuit board (not shown) of the timepiece module 11, and then the timepiece module 11 is mounted in the main body case 5.

Subsequently, the second waterproof ring 10a is arranged in the lower part of the main body case 5, and the back cover 10 is attached to the lower part of the main body case 5. Here, the lower end portion 24a of the terminal plate 24 is pressed against the upper surface of the back cover 10 and thereby further bent. In addition, the interspace S which is connected to the space section 20 is formed between the undersurface of the outer circumferential portion of the main body case 5 located closer to the outer circumferential side than the space section 20 of the connection hollow section 14 and the upper surface of the outer circumferential portion of the back cover 10 corresponding thereto. As a result, the assembly of the wristwatch is completed.

Next, the mechanism of the sensor device 4 of the wristwatch assembled as described above is described.

This sensor device 4 detects pressure such as atmospheric pressure and water pressure outside the wristwatch case 1 by the pressure sensor 13. More specifically, when the wristwatch is not in water, air in the atmosphere enters into the space section 20 of the connection hollow section 14 from the connection holes 22 formed in the two slit grooves 23b positioned not corresponding to the blocking section 21 and located to the sides of the one slit groove 23a in the middle among the plurality of slit grooves 23a to 23c in the decorative section 23 provided on the nine o'clock side of the main body case 5. Then, atmospheric pressure associated with the air that has entered into the space section 20 is reliably and favorably detected by the pressure sensor 13.

Also, when the wristwatch is in water in the sea, a lake, a river, or the like, water enters into the space section 20 of the connection hollow section 14 from the connection holes 22 formed in the two slit grooves 23b positioned not corresponding to the blocking section 21 and located to the sides of the one slit groove 23a in the middle among the plurality of slit grooves 23a to 23c in the decorative section 23 provided on the nine o'clock side of the main body case 5. Then, water pressure associated with the water that has entered into the space section 20 is reliably and favorably detected by the pressure sensor 13.

Also, foreign objects such as water and mud which have entered into the space section 20 of the connection hollow section 14 are discharged from the interspace S formed between the undersurface of the outer circumferential portion of the main body case 5 and the corresponding upper surface of the outer circumferential portion of the back cover 10 and connected to the space section 20. Accordingly, foreign objects that are entering objects do not remain in the space section 20 of the connection hollow section 14.

As described above, the sensor device 4 of this wristwatch includes the main body case 5 of the wristwatch case 1 which has the sensor housing section 12 formed in its outer circumferential portion, the pressure sensor 13 which is housed in the sensor housing section 12, and the connection hollow section 14 which is formed in the outer circumferential portion of the main body case 5 corresponding to the outer side surface 13a of the pressure sensor 13, has the blocking section 21 integrally formed with the main body case 5, and is connected to the outside of the main body case 5 while covering the outer side surface 13a of the pressure sensor 13, whereby the design is enhanced by the simple structure.

More specifically, with the sensor device 4 of this wristwatch, the pressure sensor 13 can be protected by the connection hollow section 14 only by being housed in the sensor housing section 12 of the main body case 5. Accordingly, unlike the above-described conventional technique, a protection member that is a separate part for protecting the pressure sensor 13 is not necessary. As a result, with this sensor device 4, the number of parts can be reduced by the simple structure, whereby cost reduction can be achieved.

In addition, with the sensor device 4, since the pressure sensor 13 can be protected by the connection hollow section 14 only by being housed in the sensor housing section 12 of the main body case 5, a protect member to be attached to the main body case 5, such as that of the above-described conventional technique, is not necessary, which simplifies the assembly work and enhances the design because the outer appearance and design of the main body case 5 are not subject to the restriction of such a protect member.

Also, in the sensor device 4 of this wristwatch, the connection hollow section 14 includes the space section 20 formed in the outer circumferential portion of the main body case 5 corresponding to the outer side surface 13a of the pressure sensor 13, the blocking section 21 which covers the outer side surface 13a of the pressure sensor 13, and the connection holes 22 which connect the space section 20 to the outside of the main body case 5. As a result of this structure, external pressure such as atmospheric pressure and water pressure outside the main body case 5 can be reliably and accurately detected by the pressure sensor 13.

That is, with the sensor device 4 of this wristwatch, external air, water, and the like outside the main body case can be unfailingly and favorably taken into the space section from the connection holes 22, whereby the pressure of air, water, and the like taken thereinto can be reliably and favorably detected by the pressure sensor 13. In addition, the pressure sensor 13 can be reliably and favorably protected by the blocking section 21 so that erroneous contacts such as the user touching the pressure sensor 13 or an object colliding with the pressure sensor 13 are prevented, whereby external pressure such atmospheric pressure and water pressure outside the main body case 5 can be reliably and accurately detected by the pressure sensor 13.

Moreover, in the sensor device 4 of this wristwatch, the connection holes 22 are formed in the area excluding the blocking section 21. As result of this structure, external air, water, and the like outside the main body case 5 can be unfailingly and favorably taken into the space section 20 through these connection holes 22 formed in the outer surface of the outer circumferential portion of the main body case 5 with the pressure sensor 13 being protected by the blocking section 21, and the pressure of air, water, and the like taken thereinto can be reliably and favorably detected by the pressure sensor 13.

Furthermore, in the sensor device 4 of this wristwatch, the connection hollow section 14 includes the interspace S formed between the upper surface of the outer circumferential portion of the back cover 10 that is a cover portion attached to the lower part of the main body case 5 and the undersurface of the outer circumferential portion of the main body case 5 corresponding to this upper surface of the outer circumferential portion of the back cover 10. Accordingly, objects such as water and mud that have entered into the space section 20 of the connection hollow section 14 can be reliably and favorably discharged through the interspace S. As a result of this structure, foreign objects can be unfailingly and favorably prevented from remaining in the space section 20 of the connection hollow section 14.

Still further, in the sensor device 4 of this wristwatch, the pressure sensor 13 is provided in the sensor housing section 12 of the main body case 5 via the waterproof member 15, whereby waterproofing between the outer circumferential surface of the pressure sensor 13 and the inner circumferential surface of the sensor housing section 12 can be achieved. As a result of this structure, the waterproofness of the main body case 5 is ensured.

Yet still further, in the sensor device 4 of this wristwatch, the decorative section 23 is formed on the outer surface of the outer circumferential portion of the main body case 5 including the blocking section 21 covering the outer side surface 13a of the pressure sensor 13, whereby the design of the main body case 5 can be enhanced. As a result of this structure, design enhancement is further achieved.

More specifically, the decorative section 23 is constituted by the plurality of slit grooves 23a to 23c elongated in the vertical directions, whereby high decorativeness is ensured. In addition, this decorative section 23 has the structure where the connection holes 22 connected to the space section 20 of the connection hollow section 14 are formed in the two slit grooves 23b located to the sides of the one slit groove 23a in the middle, and the other slit grooves 23a and 23c do not penetrate to the space section 20 so as not to be connected thereto, whereby the connection holes 22 are inconspicuous. By this structure as well, design enhancement is achieved.

Yet still further, in the sensor device 4 of this wristwatch, the terminal plate 24 which is an antistatic terminal member is provided inside the space section 20 of the connection hollow section 14 without blocking the connection holes 22, whereby the pressure sensor 13 is not affected by static electricity from outside the main body case 5. By this structure as well, external pressure outside the main body case 5 can be accurately detected by the pressure sensor 13.

In the above-described embodiment, the connection holes 22 of the connection hollow section 14 are formed in the outer surface of the main body case 5 on the nine o'clock side. However, the present invention is not limited thereto. For example, a structure where the connection holes 22 are formed in an upper portion of the main body case 5 on the nine o'clock side, a structure where the connection holes 22 are formed in side portions of the nine o'clock side in directions along the outer circumference of the main body case 5, or a structure where the connection holes 22 are formed in a lower portion of the main body case 5 on the nine o'clock side may be adopted.

Also, in the above-described embodiment, the decorative section 23 formed on the outer surface of the main body case on the nine o'clock side includes the plurality of slit grooves 23a to 23c elongated in the vertical directions. However, in the present invention, the plurality of slit grooves 23a to 23c is not necessarily required to be formed, and a structure having graphics or patterns instead of the plurality of slit grooves 23a to 23c may be adopted.

Moreover, in the above-described embodiment, the terminal plate 24 is provided in the space section 20 of the connection hollow section 14. However, the present invention is not necessarily required to have the terminal plate 24.

Furthermore, in the above-described embodiment, the sensor device 4 is provided on the nine o'clock side of the main body case 5. However, in the present invention, the sensor device 4 in not necessarily required to be provided on the nine o'clock side, and may be provided on any side among the one to twelve o'clock sides.

Still further, in the above-described embodiment, the present invention has been applied in a wristwatch. However, the present invention is not necessarily required to be applied in a wristwatch. For example, the present invention is applicable to various types of timepieces such as a travel watch, an alarm clock, a table clock, and a wall clock. In addition, the present invention is not necessarily required to be applied in timepieces, and can be applied in electronic devices such as cell-phones and portable information terminals.

While the present invention has been described with reference to the preferred embodiments, it is intended that the invention be not limited by any of the details of the description therein but includes all the embodiments which fall within the scope of the appended claims.

What is claimed is:

1. A sensor device comprising:
a case comprising:

a main body case having an upper part and a bottom part to which a back cover is attached, the main body case defining a sensor housing in an outer circumferential portion of the main body case between the upper part and the bottom part of the main body case; and a blocking portion connected with the upper part of the main body case; and a sensor housed in the sensor housing, wherein an inner surface of the blocking portion facing an interior of the main body case blocks an outer side surface of the sensor, wherein a space is provided between the outer circumferential portion of the main body case at which the sensor housing is provided and the inner surface of the blocking portion, and wherein an interspace is provided between a bottom surface of the blocking portion and the back cover attached to the bottom part of the main body case, the interspace connecting the space to an outside of the case.

2. The sensor device according to claim 1, wherein the sensor is a pressure sensor.

3. The sensor device according to claim 2, wherein the pressure sensor is provided in the sensor housing portion via a waterproof member.

4. A timepiece comprising the sensor device according to claim 2.

5. The sensor device according to claim 1, wherein a connection hole connects the space to the outside of the case.

6. The sensor device according to claim 5, wherein the connection hole is provided in an area excluding the blocking portion.

7. The sensor device according to claim 1, wherein the sensor is provided in the sensor housing portion via a waterproof member.

8. The sensor device according to claim 1, wherein a decorative portion is provided on an outer surface of an outer circumferential portion of the case including the blocking portion covering the outer side surface of the sensor.

9. The sensor device according to claim 8, wherein the decorative portion includes a plurality of slit grooves elongated in vertical directions of the case.

10. The sensor device according to claim 9, wherein a connection hole which connects the space to the outside of the case through a slit groove other than a slit groove provided in the blocking portion among the plurality of slit grooves.

11. The sensor device according to claim 1, wherein an antistatic terminal member is provided inside the space.

12. A timepiece comprising the sensor device according to claim 1.

* * * * *